(12) United States Patent
Parkinson

(10) Patent No.: US 9,146,944 B2
(45) Date of Patent: Sep. 29, 2015

(54) SYSTEMS AND METHODS FOR SUPPORTING TRANSACTION RECOVERY BASED ON A STRICT ORDERING OF TWO-PHASE COMMIT CALLS

(71) Applicant: Oracle International Corporation, Redwood Shores, CA (US)

(72) Inventor: Paul Parkinson, Orlando, FL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/828,590

(22) Filed: Mar. 14, 2013

(65) Prior Publication Data

US 2013/0246845 A1 Sep. 19, 2013

Related U.S. Application Data

(60) Provisional application No. 61/612,144, filed on Mar. 16, 2012, provisional application No. 61/774,356, filed on Mar. 7, 2013.

(51) Int. Cl.
| | | |
|---|---|---|
| G06F 11/00 | (2006.01) | |
| G06F 17/30 | (2006.01) | |
| G06F 9/46 | (2006.01) | |
| G06F 11/07 | (2006.01) | |
| G06F 11/14 | (2006.01) | |

(52) U.S. Cl.
CPC .......... *G06F 17/30289* (2013.01); *G06F 9/466* (2013.01); *G06F 11/0709* (2013.01); *G06F 11/1474* (2013.01)

(58) Field of Classification Search
CPC ............ G06F 11/0709; G06F 11/0793; G06F 11/1474; G06F 9/466; G06F 17/30289
USPC ............. 714/19; 707/615, 674, 684, 678, 703
See application file for complete search history.

(56) References Cited

U.S. PATENT DOCUMENTS

| | | |
|---|---|---|
| 5,261,089 A | 11/1993 | Coleman et al. |
| 5,452,445 A | 9/1995 | Hallmark et al. |
| 5,555,396 A | 9/1996 | Alferness et al. |
| 5,617,537 A | 4/1997 | Yamada et al. |

(Continued)

OTHER PUBLICATIONS

IBM, IBM DB2 Universal Database—Administration Guide: Planning, Version 8, Jan. 1, 2002, 49 pages.

(Continued)

*Primary Examiner* — Marc Duncan
(74) *Attorney, Agent, or Firm* — Tucker Ellis LLP

(57) ABSTRACT

Systems and methods are provided for supporting transaction recovery based on a strict ordering of two-phase commit calls. At least one resource manager in a mid-tier transactional environment can be designated as the "determiner resource," in order to support eliminating mid-tier transaction logs (TLOG) in processing a two-phase transaction. A transaction manager can prepare all other resource managers in the mid-tier transactional system before the determiner resource. Furthermore, the transaction manager can rely on the list of outstanding transactions to be committed that is provided by the determiner resource for recovering the transaction. The transaction manager can commit an in-doubt transaction returned from a resource manager that matches the list of in-doubt transactions returned from the determiner resource. Otherwise, the transaction manager can roll back the in-doubt transaction.

22 Claims, 6 Drawing Sheets

(56) References Cited

U.S. PATENT DOCUMENTS

| | | | |
|---|---|---|---|
| 5,680,610 A | 10/1997 | Bernard et al. | |
| 6,070,202 A | 5/2000 | Minkoff et al. | |
| 6,154,847 A * | 11/2000 | Schofield et al. | 714/4.4 |
| 6,247,023 B1 | 6/2001 | Hsiao et al. | |
| 6,470,342 B1 | 10/2002 | Gondi et al. | |
| 6,754,842 B2 * | 6/2004 | Kettley et al. | 714/2 |
| 7,103,597 B2 * | 9/2006 | McGoveran | 1/1 |
| 7,284,018 B1 | 10/2007 | Waldorf et al. | |
| 7,380,155 B2 * | 5/2008 | Fung et al. | 714/4.11 |
| 7,430,740 B1 | 9/2008 | Molloy et al. | 718/101 |
| 7,694,178 B2 * | 4/2010 | Hobson | 714/16 |
| 7,743,036 B2 * | 6/2010 | Cotner et al. | 707/674 |
| 7,970,737 B2 * | 6/2011 | Parkinson | 707/611 |
| 8,671,085 B2 * | 3/2014 | Dhamankar et al. | 707/703 |
| 8,738,964 B2 * | 5/2014 | Markus | 714/20 |
| 8,868,506 B1 | 10/2014 | Bhargava et al. | |
| 2001/0047436 A1 | 11/2001 | Sexton et al. | |
| 2002/0023129 A1 * | 2/2002 | Hsiao et al. | 709/205 |
| 2002/0116568 A1 | 8/2002 | Oksanen | |
| 2003/0005172 A1 | 1/2003 | Chessel | |
| 2003/0035372 A1 | 2/2003 | Schaub | |
| 2003/0154423 A1 | 8/2003 | Egolf | |
| 2004/0123293 A1 | 6/2004 | Johnson | |
| 2004/0153349 A1 | 8/2004 | K et al. | |
| 2004/0153450 A1 | 8/2004 | K et al. | |
| 2004/0158549 A1 | 8/2004 | Matena et al. | |
| 2005/0044551 A1 | 2/2005 | Sodhi | |
| 2005/0144171 A1 | 6/2005 | Robinson | |
| 2005/0144299 A1 | 6/2005 | Blevins | |
| 2005/0262055 A1 * | 11/2005 | Newport | 707/3 |
| 2006/0075277 A1 * | 4/2006 | Johnson et al. | 714/4 |
| 2006/0080668 A1 | 4/2006 | Blackmore et al. | |
| 2006/0136887 A1 | 6/2006 | Kaczynski et al. | |
| 2006/0149791 A1 * | 7/2006 | Sinha et al. | 707/202 |
| 2006/0179125 A1 | 8/2006 | Pavlik et al. | |
| 2007/0041392 A1 | 2/2007 | Kunze et al. | |
| 2007/0079077 A1 | 4/2007 | Baines et al. | |
| 2007/0156729 A1 | 7/2007 | Shaylor | |
| 2008/0127219 A1 | 5/2008 | Lacombe et al. | |
| 2008/0177955 A1 | 7/2008 | Su | |
| 2008/0243865 A1 | 10/2008 | Hu et al. | |
| 2008/0250074 A1 * | 10/2008 | Parkinson | 707/200 |
| 2009/0070330 A1 | 3/2009 | Hwang et al. | |
| 2009/0158397 A1 | 6/2009 | Herzog et al. | |
| 2009/0248765 A1 | 10/2009 | Akidau et al. | |
| 2009/0292744 A1 * | 11/2009 | Matsumura | 707/202 |
| 2010/0042999 A1 | 2/2010 | Dorai et al. | |
| 2010/0169284 A1 | 7/2010 | Walter et al. | |
| 2010/0198920 A1 | 8/2010 | Wong et al. | |
| 2011/0055313 A1 | 3/2011 | Little | |
| 2011/0087633 A1 | 4/2011 | Kreuder et al. | |
| 2011/0145204 A1 * | 6/2011 | Maple et al. | 707/682 |
| 2012/0084274 A1 * | 4/2012 | Renkes et al. | 707/703 |
| 2012/0131285 A1 | 5/2012 | Leschiner et al. | |
| 2012/0166889 A1 * | 6/2012 | El-Kersh et al. | 714/48 |
| 2012/0210094 A1 | 8/2012 | Blocksome et al. | |

OTHER PUBLICATIONS

International Searching Authority, International Search Report and Written Opinion for PCT International Patent Application No. PCT/US2013/032444, Jul. 5, 2013, 11 pages.

International Searching Authority, International Search Report and Written Opinion for PCT International Patent Application No. PCT/US2013/032473, Jul. 5, 2013, 12 pages.

* cited by examiner

SYSTEMS AND METHODS FOR SUPPORTING TRANSACTION RECOVERY BASED ON A STRICT ORDERING OF TWO-PHASE COMMIT CALLS

CLAIM OF PRIORITY

This application claims priority on U.S. Provisional Patent Application No. 61/612,144, entitled "SYSTEM AND METHOD FOR PROVIDING DISTRIBUTED TRANSACTION PROCESSOR DATABASE AFFINITY AND DISTRIBUTED TRANSACTION PROCESS OPTIMIZATION," by inventors Todd Little, Edward A. Heeren, Paul Parkinson, Carol L. Colrain, Nancy Ikeda, Peizhi Shi, Right Lv, Jim Jin and Xugang Shen, filed Mar. 16, 2012, and U.S. Provisional Patent Application No. 61/774,356, entitled "SYSTEMS AND METHODS FOR SUPPORTING TRANSACTION RECOVERY WITHOUT TRANSACTION LOGS (TLOGS)," by inventors Paul Parkinson, Todd J. Little, Stefan Heinrich Roesch, Carol L. Colrain, Edward A. Heeren, filed Mar. 7, 2013, which applications are herein incorporated by reference.

CROSS REFERENCE TO RELATED APPLICATIONS

This application is related to the following patent application, which is hereby incorporated by reference in its entirety:

U.S. Patent Application entitled "SYSTEMS AND METHODS FOR SUPPORTING INLINE DELEGATION OF MIDDLE-TIER TRANSACTION LOGS TO DATABASE", application Ser. No. 13/828,490, filed Mar. 14, 2013.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software such as middleware, and is particularly related to transactional middleware.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Systems and methods are provided for supporting transaction recovery based on a strict ordering of two-phase commit calls. At least one resource manager in a mid-tier transactional environment can be designated as the "determiner resource," in order to support eliminating mid-tier transaction logs (TLOG) in processing a two-phase transaction. A transaction manager can prepare all other resource managers in the mid-tier transactional system before the determiner resource. Furthermore, the transaction manager can rely on the list of outstanding transactions to be committed that is provided by the determiner resource for recovering the transaction. The transaction manager can commit an in-doubt transaction returned from a resource manager that matches the list of in-doubt transactions returned from the determiner resource. Otherwise, the transaction manager can roll back the in-doubt transaction.

Other objects and advantages of the present invention will become apparent to those skilled in the art from the following detailed description of the various embodiments, when read in light of the accompanying drawings.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Tuxedo environment as an example for a transactional middleware machine environment. It will be apparent to those skilled in the art that other types of transactional middleware machine environments can be used without limitation.

Described herein are systems and methods for supporting transaction recovery based on a strict ordering of two-phase commit calls. At least one resource manager in a mid-tier transactional environment can be designated as the "determiner resource," in order to support eliminating mid-tier transaction logs (TLOG) in processing a two-phase transaction. A transaction manager can prepare all other resource managers in the mid-tier transactional system before the determiner resource. Furthermore, the transaction manager can rely on the list of outstanding transactions to be committed that is provided by the determiner resource for recovering the transaction. The transaction manager can commit an in-doubt transaction returned from a resource manager that matches the list of in-doubt transactions returned from the determiner resource. Otherwise, the transaction manager can roll back the in-doubt transaction.

A Transactional Environment and Global Transaction

Figure 1:
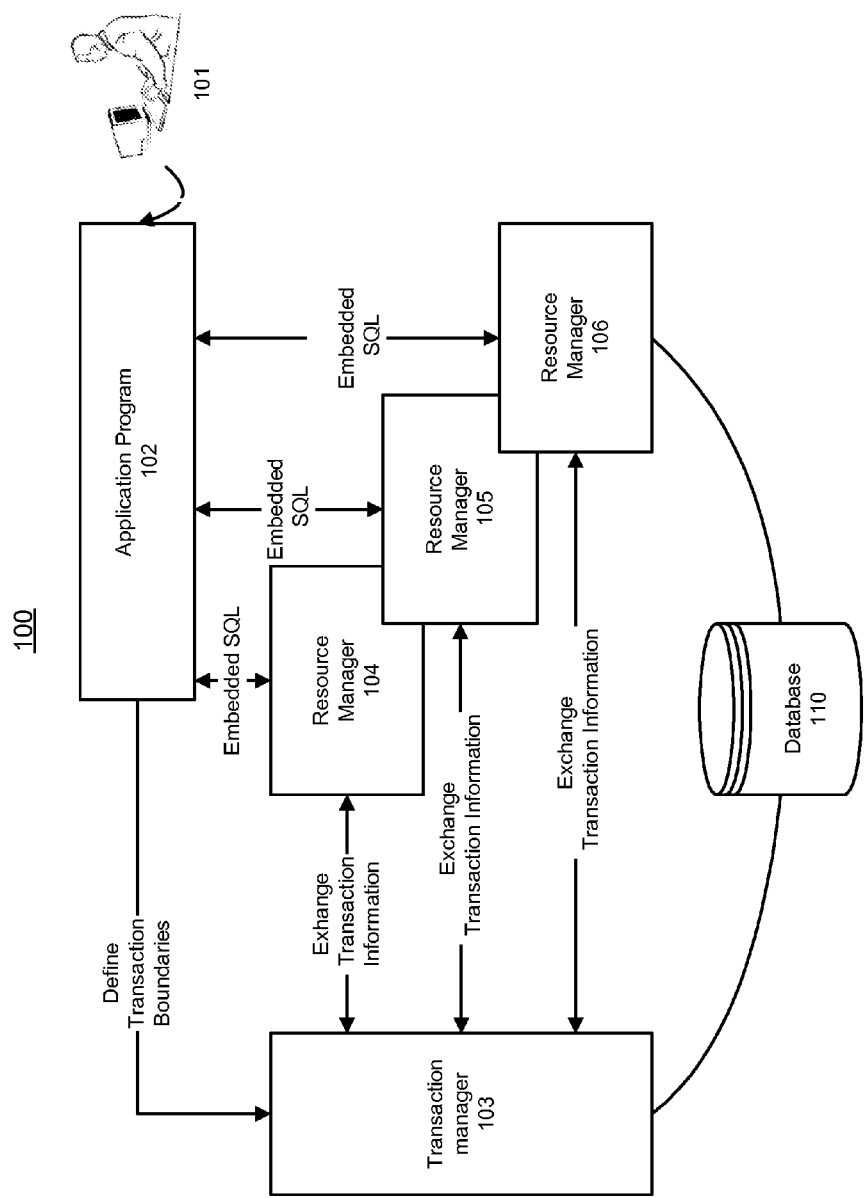
FIG. 1 shows an illustration of a transactional environment, in accordance with an embodiment of the invention.

FIG. 1 shows an illustration of a transactional environment, in accordance with an embodiment of the invention. As shown in FIG. 1, a transactional environment 100 can include an end user 101, an application program 102, one or more transaction managers (TM) 103, a plurality of resource managers (RM) 104-106, and one or more persistence stores, e.g. the database 110.

In accordance with one embodiment of the invention, the application program 102 can specify actions that constitute a transaction. As illustrated, the application program 102 communicates with the transaction manager 103 to begin, commit, or abort a transaction, and the transaction manager 103 can send back the start, end and disposition of the transaction to the application program 102. Furthermore, the application program 102 can define transaction boundaries for the transaction manager 103, which can exchange transaction information with the plurality of resource managers (RM) 104-106. In addition, the application program 102 can communicate with the plurality of resource managers 104-106 via Embedded Structured Query (SQL) to do useful work.

The plurality of resource managers 104-106 can provide access to persistence stores, e.g. the database 110. In accordance with an embodiment of the invention, the plurality of resource managers 104-106 can implement XA interfaces to handle database connections and disconnections transparently to persistence stores. The XA interfaces can be based on a specification that describes the protocol for transaction coordination, commitment, and recovery. An XA resource participating in a transaction can comprise an XA resource manager and a backend persistence store.

In accordance with various embodiments of the invention, a transactional system can support a global transaction, which can be executed on more than one server, and is capable of accessing data from more than one resource manager.

A global transaction can be treated as a specific sequence of operations that are characterized by the four properties of atomicity, consistency, isolation, and durability (ACID). The global transaction can be a logical unit of work that has the following features:
 All portions either succeed or have no effect.
 Operations are performed that correctly transform the resources from one consistent state to another.
 Intermediate results are not accessible to other transactions, although other processes in the same transaction may access the data.
 All effects of a completed sequence cannot be altered by any kind of failure.

Furthermore, a global transaction may include several local transactions, each accessing a single resource manager. A local transaction can access a single database or file and can be controlled by the resource manager responsible for performing concurrency control and atomicity of updates at that distinct database. A given local transaction may be either successful or unsuccessful in completing its access.

Additionally, the transaction manager 103 can assign global transaction identifiers (GTRIDs) to the different transactions in transactional environment 100. The transaction manager 103 can monitor their progress, and take responsibility for ensuring transaction completion and providing failure recovery. In addition, the transaction manager 103 can communicate with the plurality of resource managers 104-105 via XA interfaces to exchange transaction information, such as sending two-phase commits calls to the resource managers 104-105.

Two-phase Commit (2PC)

A two-phase-commit (2PC) protocol can be used to execute a transaction, such as a loosely-coupled global transaction. The two-phase-commit protocol (2PC) can include a prepare phase and a commit phase. In the prepare phase, a coordinating transaction manager (TM) instructs the participating resource managers (RMs) to take the necessary steps for either committing or aborting the transaction. In the commit phase, the transaction manager (TM) decides whether to commit or abort the transaction, based on the results of the prepare phase.

Figure 2:
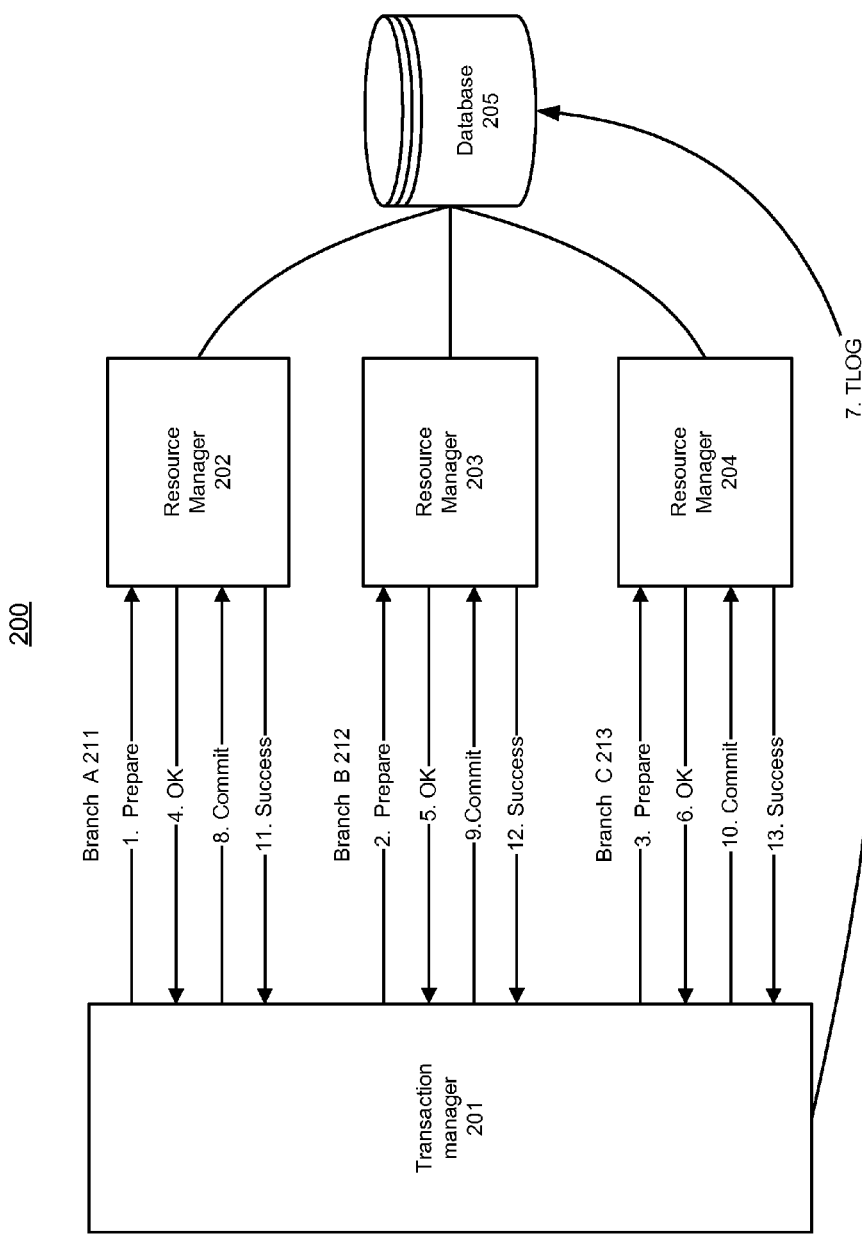
FIG. 2 shows an illustration of supporting two-phase commit in a transactional middleware machine environment.

FIG. 2 shows an illustration of supporting two-phase commit in a transactional middleware machine environment. As shown in FIG. 2, a transactional environment 200 can include a transaction manager 201 that supports the execution of various transactions, and one or more resource managers 202-204 that manage one or more data source, e.g. a database 205.

For example, the transaction manager 201 can execute a transaction that involves transaction branch A 211, transaction branch B 212, and transaction branch C 213, each of which can be executed against a resource manager 202-204 respectively. If any branch fails in the transaction, the transaction manager 201 can help the resource manager 202-204 decide whether to commit, or roll back, the transaction.

As shown in FIG. 2, the transaction manager 201 can send a prepare instruction to the resource manager 202-204 on all three branches (steps 1, 2, and 3). After the resource managers 202-204 return an "OK" vote (steps 4, 5 and 6), the transaction manager 201 can write a transaction log to the database 205 (step 7).

The transaction log (TLOG) may be written either to files, or to a database, so that the transaction manager 201 can have enough information to recover the transaction if any branch fails during the commit phase.

Then, the transaction manager 201 can instruct the resource manager 202-204 to commit all three branches (steps 8, 9 and 10). The resource manager 202-204 can inform the transaction manager 201 after successfully completing the commit phase (steps 11, 12 and 13).

Transaction Recovery Based on a Transaction Log (TLOG)

In accordance with one embodiment of the invention, a transaction log (TLOG) can hold the decisions for committing transactions by a transaction manager. For example, the TLOG can store a resource checkpoint record, which can be persisted by the transaction manager to enable it to track the different participating XA resources.

A transaction can be written in the TLOG when a transaction manager receives a success vote from all transaction branches after the prepare phase. The transaction record in TLOG can include at least a transaction identifier (XID), which further includes a GTRID assigned by a transaction manager, and a local XID assigned by a resource manager where the transaction is executed.

Furthermore, the TLOG can hold records of the state of in-flight transactions that are marked to be committed. The TLOG is beneficial to recover in-doubt transactions, which are the transactions that have been prepared but have not yet been committed in a mid-tier transactional system, after a system crash. Without recovering the in-doubt transactions, the system can be in an incorrect and inconsistent state after a crash.

For example, if a system fails during a two-phase commit transaction, the updates to one backend data store may have committed, but the updates to another data store, in the same transaction, may not yet have been instructed to commit, i.e. the data store's updates are still pending. Once the failed parts of the system have been re-started, the data stores holding pending updates may not be able to know whether the updates should be committed or rolled-back.

Figure 3:
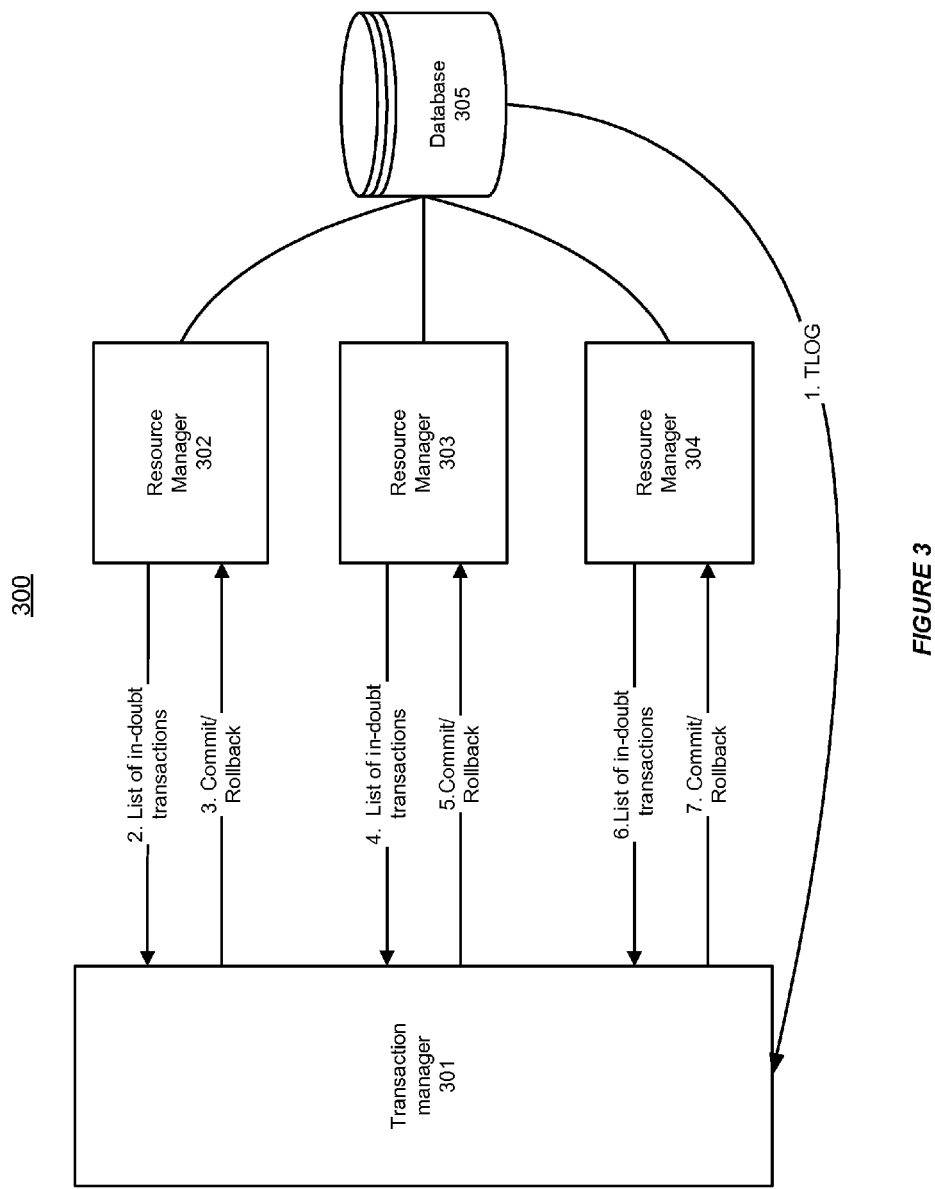
FIG. 3 shows an illustration of recovering in-doubt transactions in a transactional middleware machine environment.

FIG. 3 shows an illustration of recovering in-doubt transactions in a transactional middleware machine environment. As shown in FIG. 3, the transactional middleware machine environment 300 includes a transaction manager 301, and a plurality of resource managers 302-304, and a persistence store, i.e. a database 305.

The transaction manager 301 can automatically determine whether a global transaction is in-doubt, by reading the TLOG (step 1). Then, the transaction manager 301 can poll the relevant backend data stores of the participating resource managers 302-304. Each of the participating resource managers 302-304 can return a list of in-doubt transactions, which are the transactions that the transaction manager 301 does not know whether to roll it back or commit (steps 2, 4 and 6).

Furthermore, the transaction managers 301 can match each in-doubt transaction with the TLOG, and proceed to either commit or roll back the in-doubt transactions on different resource managers 302-304 (steps 3, 5 and 7). For example, when an in-doubt transaction appears in the TLOG, an XAResource.commit( ) can be called to commit the in-doubt transaction to a resource manager specified in the TLOG. On the other hand, when a transaction is not in the TLOG, i.e. a commit decision has not been made on the transaction before a crash, an XAResource.rollback( ) can be called to roll it back on a resource manager based on the transaction identifier (XID).

As shown in FIG. 3, a transaction may have been prepared on a resource manager 302 and the system crashes before the resource manager 302 can send the success vote to the transaction manager 301. Then, the transaction manager 301 may not be able to receive a success vote from all transaction branches, and therefore can not log the transaction in the TLOG. Accordingly, the transaction manager 301 can roll back all branch transactions on their respective resource managers 302-304. Thus, using such a consistent and predictable transaction recovery approach, a transaction manager can avoid a mixed heuristic completion where some branches are committed and some are rolled back.

Alleviating the Need for Transaction Manager Recovery Logs

In a transactional environment, recovery information can be persisted to stable storage in order to conduct recovery and ensure ACID properties is a design requirement of two-phase commit transaction managers.

For example, the (XA) two-phase logging algorithm can involve the following steps:
1. The application uses multiple XA resources in a transaction and issues commit for the transaction.
2. The transaction manager issues XAResource.prepare on all XA resource participants.
3. The transaction manager persists a transaction log which contains the format id and global transaction id of the transaction.
4. The transaction manager issues XAResource.commit on all the XA resource participants.
5. The transaction manager (generally lazily, in batches, etc.) purges/deletes the transaction record.
6. In the event of failure, the persisted transaction records are matched to the in-doubt Xids returned from XAResource.recover calls made on all involved resource managers and recovery by commit or rollback is conducted accordingly.

The need to persist recovery information to stable storage, alongside the actual protocol network calls to resource managers, can inflict performance cost for two-phase commit transactions. It can also carry asset capacity cost due to the shared file system or database storage necessary for highly-available stable storage as well as administrative cost due to the management of this storage. These costs may escalate in the case of site-wide disaster recovery where (synchronous) replication and again management of the same are required. Thus, alleviating the need for transaction manager recovery logs can provide a significant improvement over existing systems.

In accordance with one embodiment of the invention, using the following technique, it is possible to alleviate the need for transaction logs by providing transaction recovery and ACID properties based on strict ordering of two-phase commit calls and the classification of one resource participant as the determiner of recovery:
1. The application uses multiple XA resources in a transaction and issues commit for the transaction.
2. Certain resources can be configured to be designated as the "determiner" of transaction outcomes. If no such resource is configured the transaction system will nominate one and persist this in configuration.
3. Whenever a resource is first used or a new combination of resources is first used in a two-phase transaction, this combination is captured and persisted in configuration automatically by the transaction processing subsystem. This configuration persistence occurs just before the first prepare issued for such a transaction. If this configuration change fails the transaction can be rolled back. While not necessary, this step provides further optimization as it reduces the set of resources that require XAResource.recover calls during recovery.
4. The transaction manager forgoes any transaction logging.
5. The transaction manager issues XAResource.prepare on all XA resource participants, preparing the "determiner" resource last.
6. The transaction manager issues XAResource.commit on all XA resource participants, committing the "determiner" resource last.
7. In the event of failure, a XAResource.recover scan is conducted on all non-"determiner" resources in configuration and the in-doubt Xids are matched to the in-doubt Xids returned from the determiner resource's XAResource.recovery. Recovery by commit if there is a match/existing Xid in the determiners list or by rollback if there isn't is conducted accordingly.
8. During a clean shutdown or restart of the transaction system the configuration is purged/marked in such a way that unnecessary recover calls and processing are not conducted during startup.

The above-mentioned technique can be described in more details in the following sections.

A Strict Ordering of the Two-phase Commit (2PC) Calls

In accordance with an embodiment of the invention, the system can eliminate mid-tier transaction logs (TLOGs) in processing a transaction, based on a strict ordering of the two-phase commit calls.

Figure 4:
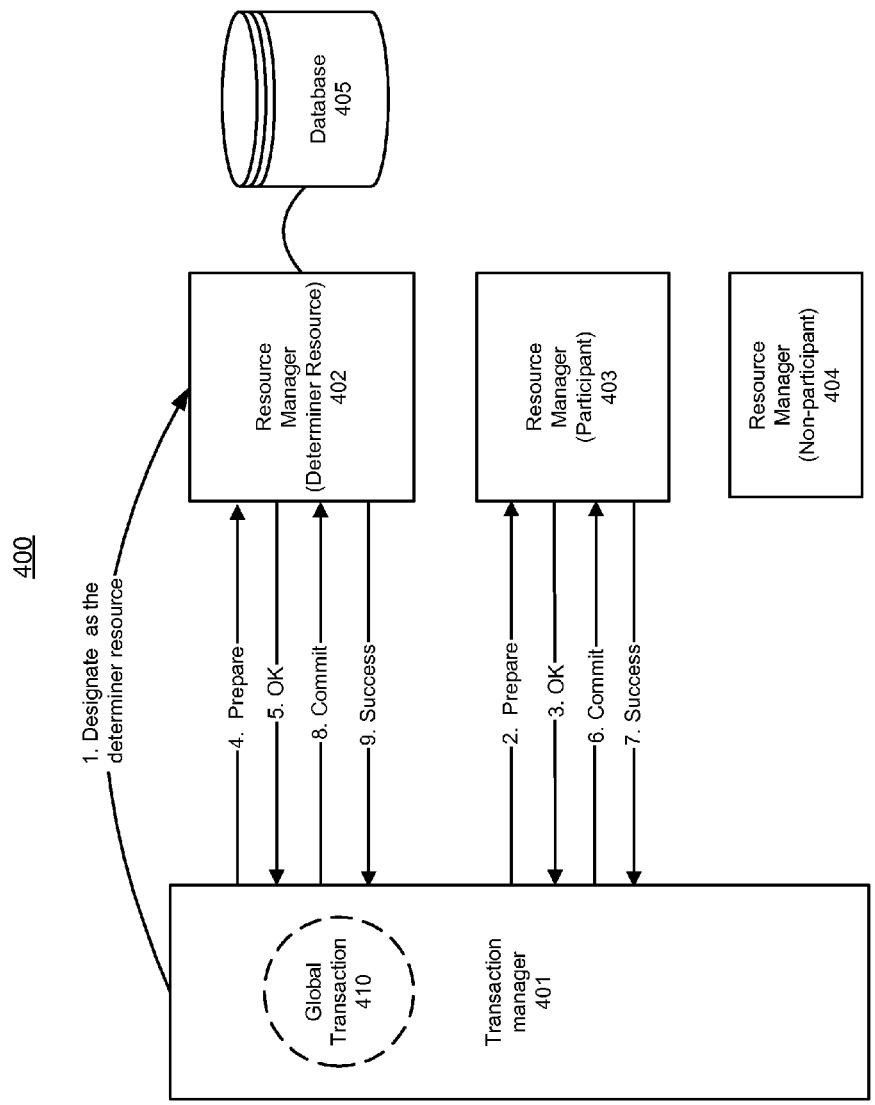
FIG. 4 shows an illustration of supporting a strict ordering of two-phase commit (2PC) calls for processing a transaction in a transactional middleware machine environment, in accordance with an embodiment of the invention.

FIG. 4 shows an illustration of supporting a strict ordering of two-phase commit (2PC) calls for processing a transaction in a transactional middleware machine environment, in accordance with an embodiment of the invention. As shown in FIG. 4, a global transaction 410 can be supported in a mid-tier transactional system 400 that includes a transaction manager (TM) 401, a plurality of resource managers (RMs) 402-404. The resource managers (RMs) 402-403 participate in the global transaction 410, and the resource manager 404 does not participate in the global transaction 410. In accordance with an embodiment of the invention, the transaction 410 does not span multiple transactional managers.

The transaction manager 401 can designate a resource, e.g. the resource manager (RM) 402 that is associated with the database 405, as the determiner resource (step 1). The designation of the resource manager (RM) 402, as the determiner resource, can be persisted in the configuration for the transaction machine environment. When no determiner resource is designated in a transaction in configuration, the transaction manager 401 can nominate a data source as the determiner resource and persist it in the configuration. Additionally, the determiner resource 402 can be a resource other than a database, such as a message queue.

Furthermore, whenever a resource is first used or a new combination of resources is first used in processing the two-phase transaction 410, the new resource or the new combination of resources can be captured and persisted in the configuration, such as a configuration file, automatically by the transaction manager 401. This configuration persistence can occur right before the first prepare request is issued for the two-phase transaction. If this configuration change fails, the transaction 410 can be rolled back.

In accordance with an embodiment of the invention, the transaction manager 401 can ensure that the determiner resource, e.g. resource manager 402, to be the last prepared and committed among all participating resource managers, for a two phase transaction 410.

As shown in FIG. 4, the transaction manager 401 can first prepare the resource manager (RM) 403 (step 2), before preparing the determiner resource (step 4). After receiving a "Ok" vote from the participating resource managers (RMs) 402-403 (steps 3 and 5), the transaction manager 401 can commit the resource manager (RM) 403 (step 6), followed by the determiner resource (step 8). The transaction can be completed after the transaction manager 401 receives a success indication from each of the resource managers 402-403 (steps 7 and 9).

Thus, the transaction manager 401 can forgo any logging of resources/checkpoints, including writing a TLOG after the prepare phase is handled successfully. The system can improve the performance of the transaction, while allowing the mid-tier transactional system 400 to recover the transaction 410.

Recovering a Global Transaction without Using a TLOG

Figure 5:
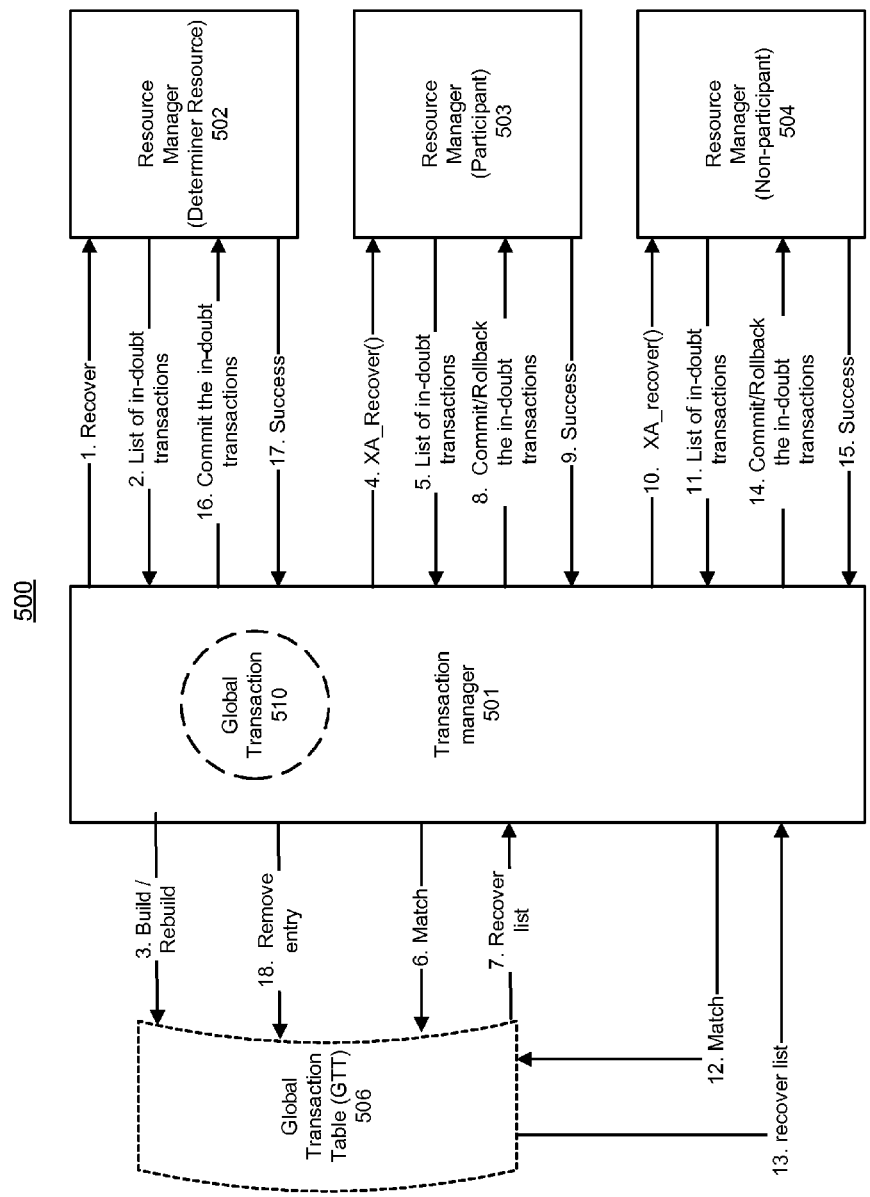
FIG. 5 shows an illustration of recovering a global transaction without using a transaction log (TLOG), in accordance with an embodiment of the invention.

FIG. 5 shows an illustration of recovering a global transaction without using a transaction log (TLOG), in accordance with an embodiment of the invention. As shown in FIG. 5, a global transaction 510 can be supported in a mid-tier transactional system 500 that includes a transaction manager (TM) 501, a plurality of resource managers (RM) 502-504.

When the transaction 510 needs to be recovered, the transaction manager 501 can attempt to recover, e.g. by placing an XA_recover( ) call, on the determiner resource 502 (step 1). The transaction manager 501 can receive a list of in-doubt transactions (prepared but not committed transactions) from the determiner resource 502 (step 2). Furthermore, the transaction manager 501 can use the list of in-doubt transactions to build/rebuild the global transaction table (GTT 506) (steps 3).

In accordance with one embodiment of the invention, when the determiner resource 502 is successfully prepared in the two-phase commit transaction, the list of in-doubt transactions can be identical to mid-tier outstanding transactions that the transaction manager 501 has instructed the participating resource managers 502-503 to commit.

Then, the transaction manager 501 can attempt to recover, e.g. by placing an XA_recover( ) call, on all the other resource managers in the transactional mid-tier system 500, including the participating resource manager 503 (step 9) and the non-participating resource manager 504 (step 10).

For example, the transaction manager 501 can receive a list of in-doubt transactions from the participating resource manager 503 (step 5). The transaction manager 501 can match the in-doubt transactions in the list with the GTT 506 table to generate a recover list (steps 6 and 7). Then, the transaction manager 501 can recover the participating resource manager 503 based on the recover list (step 8). For example, the transaction manager 501 can commit the in-doubt transactions that match the GTT 506 table, and can roll back the in-doubt transactions that do not match the GTT 506 table.

The above procedures can be performed on the resource manager 504, which is a non-participating resource. As illustrated in FIG. 5, after placing an XA_recover( ) call on the resource manager 504, the transaction manager 501 can receive a list of in-doubt transactions (step 11), which can be matched with the GTT 506 to generate a recover list (step 12). Then, the transaction manager 501 can commit/rollback the in-doubt transactions on the resource manager 504 (steps 14 and 15).

Once all the other resource managers 503-504 are recovered (steps 9 and 15), the transaction manager 501 can commit all transactions in the list of prepared transactions to the determiner resource manager (steps 16 and 17). Finally, transaction manager 501 can remove the entries in the GTT 506 (step 18).

As described herein, no transaction from the list of in-doubt transactions can be committed to the determiner resource manager 502 until all other resource managers 503-504 have been recovered, even if one or more resource managers are not part of the transaction.

In one embodiment of the invention, the transaction manager 501 can have knowledge of the participating resources 502, 503 of the transaction if additional information about the participating resources 502, 503 can be passed along and persisted to the determiner resource 502 in the prepare phase. With the additional information, the transaction manager 501 can commit the transactions in the list of in-doubt transactions returned from the determiner resource manager 502, without waiting for all known resource managers 502-504 to recover. The transaction manager 501 may only need to wait until all participants of the transaction 502-503 are recovered.

Additionally, during a clean shutdown or restart of the transactional mid-tier system 500, the configuration can be purged or marked, in such a way that unnecessary recovery and processing may be avoided during startup.

Figure 6:
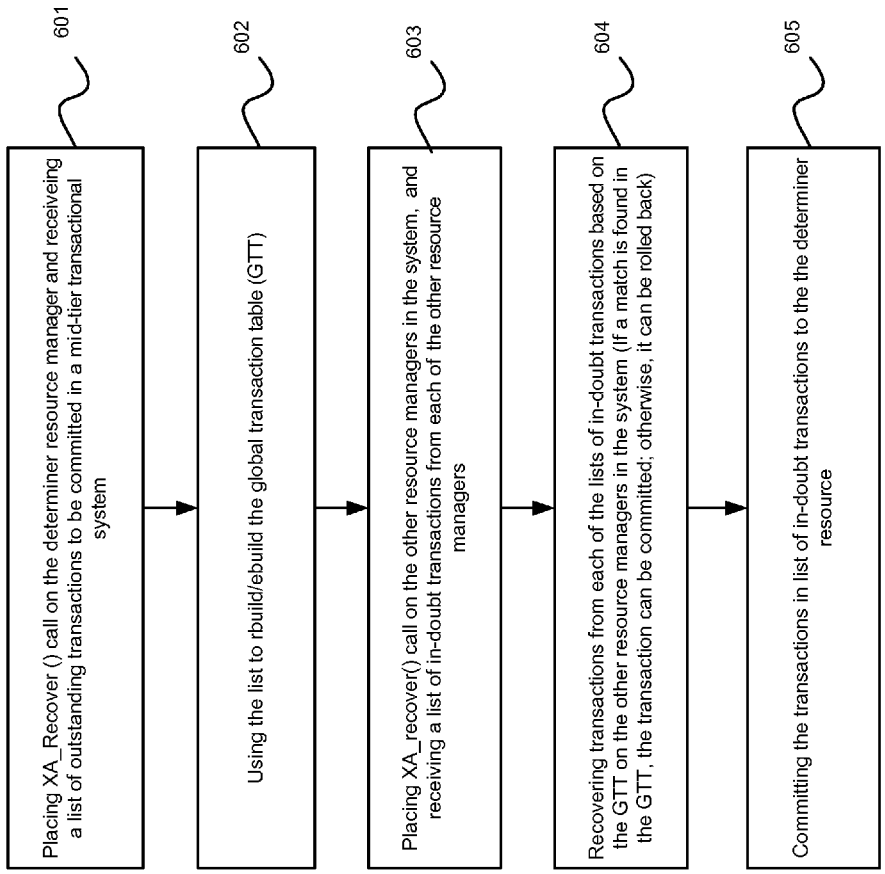
FIG. 6 is an illustrative flow chart of recovering a two-phase commit transaction without using a transaction log (TLOG), in accordance with an embodiment of the invention.

FIG. 6 is an illustrative flow chart of recovering a two-phase commit transaction without using a transaction log (TLOG), in accordance with an embodiment of the invention. As shown in FIG. 6, at step step 601, a transaction manager can performs an XA_recover( ) call on the determiner resource and receives a list of outstanding transactions to be committed in a mid-tier transactional system. Then, at step step 602, the transaction manager can use the list of prepared transactions to rebuild the global transaction table (GTT) table. Next, at step step 603, the transaction manager can perform an XA_recover( ) call on each of the other resource managers in the system, including participants or non-participants of the transaction, and can receive a list of in-doubt transaction from each of the other resource managers. At the step 604, the transaction manager can recover each transaction from the lists of in-doubt transactions by matching the transaction with the GTT table. The transaction can be committed to the resource manager from which the transaction is retrieved if a match is found in the GTT table; otherwise, it can be rolled back. Finally, at step 605, the transaction manager can commit the transactions in the in-doubt transactions from the determiner resource, after all the in-doubt transactions on the other resource managers are recovered.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting recovery of transactions on a plurality of resource managers, the method comprising:
   designating a resource manager in the plurality of resource managers to be a determiner resource manager;
   providing a transaction manager configured to process said transactions by,
      sending a prepare message to the determiner resource manager only after receiving acknowledgement of successful prepare actions on all other resource managers in the plurality of resource managers for each said transaction, and
      sending a commit message to the determiner resource manager only after receiving acknowledgement of successful commit actions on all other resource managers in the plurality of resource managers for each said transaction; and
   in the event of failure,
      retrieving a list of in-doubt transactions from each resource manager in the plurality of resource managers including the determiner resource manager, and
      recovering all in-doubt transactions without using a transaction log by comparing the list of in-doubt transactions retrieved from each resource manager other than the determiner resource manager with the list of in-doubt transactions retrieved from the determiner resource manager.

2. The method of claim 1, wherein recovering all in-doubt transactions without using a transaction log comprises:
   comparing the list of in-doubt transactions retrieved from each resource manager other than the determiner resource manager with the list of in-doubt transactions retrieved from the determiner resource manager; and
   rolling back one or more in-doubt transactions which appear in the list of in-doubt transactions retrieved from each resource manager other than the determiner resource manager but do not appear in the list of in-doubt transactions retrieved from the determiner resource manager.

3. The method of claim 1, wherein recovering all in-doubt transactions without using a transaction log comprises:
   comparing the list of in-doubt transactions retrieved from each resource manager other than the determiner resource manager with the list of in-doubt transactions retrieved from the determiner resource manager; and
   committing one or more in-doubt transactions which appear in the list of in-doubt transactions retrieved from each resource manager other than the determiner resource manager and which also appear in the list of in-doubt transactions retrieved from the determiner resource manager.

4. The method of claim 3, further comprising:
   persisting the designation of the determiner resource manager in a configuration for a transactional mid-tier system.

5. The method of claim 1, wherein recovering all in-doubt transactions without using a transaction log comprises:
   comparing the list of in-doubt transactions retrieved from each resource manager other than the determiner resource manager with the list of in-doubt transactions retrieved from the determiner resource manager;
   committing all in-doubt transactions which appear in the list of in-doubt transactions retrieved from each resource manager other than the determiner resource manager and which also appear in the list of in-doubt transactions retrieved from the determiner resource manager; and
   rolling back all in-doubt transactions which appear in the list of in-doubt transactions retrieved from each resource manager other than the determiner resource manager but do not appear in the list of in-doubt transactions retrieved from the determiner resource manager.

6. The method of claim 1, further comprising:
   allowing at least one resource manager in the plurality of resource managers to be a non-participant of the transactions.

7. The method of claim 1, further comprising:
   committing a transactions which appear in the list of in-doubt transactions retrieved from the determiner resource manager after recovering all other resource managers in the plurality of resource managers.

8. The method of claim 1, further comprising:
   building/rebuilding a global transaction table (GTT) from the list of in-doubt transactions retrieved from the determiner resource manager.

9. The method of claim 1, further comprising:
   passing, to the determiner resource manager, a list of participant resource managers in the plurality of resource managers.

10. The method of claim 9, further comprising:
    configuring the determiner resource manager to wait, before recovering, until the list of participant resource managers are recovered.

11. A non-transitory machine readable storage medium having instructions stored thereon for supporting recovery of transactions on a plurality of resource managers, which instructions, when executed, cause a computer system to perform steps comprising:

designating a resource manager in the plurality of resource managers to be a determiner resource manager;

providing a transaction manager configured to process said transactions by, sending a prepare message to the determiner resource manager only after receiving acknowledgement of successful prepare actions on all other resource managers in the plurality of resource managers for each said transaction, and sending a commit message to the determiner resource manager only after receiving acknowledgement of successful commit actions on all other resource managers in the plurality of resource managers for each said transaction; and in the event of failure, retrieving a list of in-doubt transactions from each resource manager in the plurality of resource managers including the determiner resource manager, and recovering all in-doubt transactions without using a transaction log by comparing the list of in-doubt transactions retrieved from each resource manager other than the determiner resource manager with the list of in-doubt transactions retrieved from the determiner resource manager.

12. The non-transitory machine readable storage medium of claim 11, wherein recovering all in-doubt transactions without using a transaction log comprises:

comparing the list of in-doubt transactions retrieved from each resource manager other than the determiner resource manager with the list of in-doubt transactions retrieved from the determiner resource manager; and rolling back one or more in-doubt transactions which appear in the list of in-doubt transactions retrieved from each resource manager other than the determiner resource manager but do not appear in the list of in-doubt transactions retrieved from the determiner resource manager.

13. The non-transitory machine readable storage medium of claim 11, wherein recovering all in-doubt transactions without using a transaction log comprises:

comparing the list of in-doubt transactions retrieved from each resource manager other than the determiner resource manager with the list of in-doubt transactions retrieved from the determiner resource manager; and committing one or more in-doubt transactions which appear in the list of in-doubt transactions retrieved from each resource manager other than the determiner resource manager and which also appear in the list of in-doubt transactions retrieved from the determiner resource manager.

14. The non-transitory machine readable storage medium of claim 11, wherein recovering all in-doubt transactions without using a transaction log comprises:

comparing the list of in-doubt transactions retrieved from each resource manager other than the determiner resource manager with the list of in-doubt transactions retrieved from the determiner resource manager;

committing all in-doubt transactions which appear in the list of in-doubt transactions retrieved from each resource manager other than the determiner resource manager and which also appear in the list of in-doubt transactions retrieved from the determiner resource manager; and rolling back all in-doubt transactions which appear in the list of in-doubt transactions retrieved from each resource manager other than the determiner resource manager but do not appear in the list of in-doubt transactions retrieved from the determiner resource manager.

15. The non-transitory machine readable storage medium of claim 11, wherein said steps further comprise:

committing transactions which appear in the list of in-doubt transactions retrieved from the determiner resource manager after recovering all other resource managers in the plurality of resource managers.

16. The non-transitory machine readable storage medium of claim 11, wherein said steps further comprise:

passing, to the determiner resource manager, a list of participant resource managers in the plurality of resource managers; and configuring the determiner resource manager to wait, before recovering, until the list of participant resource managers are recovered.

17. A system for supporting recovery of transactions, the system comprising:

a computer system comprising a microprocessor and a memory a transaction manager operating on said computer system;

a plurality of resource managers;

wherein said transaction manager is configured to process said transactions by, sending a prepare message to the determiner resource manager only after receiving acknowledgement of successful prepare actions on all other resource managers in the plurality of resource managers for each said transaction, and sending a commit message to the determiner resource manager only after receiving acknowledgement of successful commit actions on all other resource managers in the plurality of resource managers for each said transaction; and in the event of failure, the system is configured to retrieve a list of in-doubt transactions from each resource manager in the plurality of resource managers including the determiner resource manager, and recover all in-doubt transactions without using a transaction log by comparing the list of in-doubt transactions retrieved from each resource manager other than the determiner resource manager with the list of in-doubt transactions retrieved from the determiner resource manager.

18. The system of claim 17 wherein, in the event of a failure the system is configured to recover all in-doubt transactions without using a transaction log by:

comparing the list of in-doubt transactions retrieved from each resource manager other than the determiner resource manager with the list of in-doubt transactions retrieved from the determiner resource manager; and rolling back one or more in-doubt transactions which appear in the list of in-doubt transactions retrieved from each resource manager other than the determiner resource manager but do not appear in the list of in-doubt transactions retrieved from the determiner resource manager.

19. The system of claim 17 wherein, in the event of a failure the system is configured to recover all in-doubt transactions without using a transaction log by:

comparing the list of in-doubt transactions retrieved from each resource manager other than the determiner resource manager with the list of in-doubt transactions retrieved from the determiner resource manager; and committing one or more in-doubt transactions which appear in the list of in-doubt transactions retrieved from each resource manager other than the determiner resource manager and which also appear in the list of in-doubt transactions retrieved from the determiner resource manager.

20. The system of claim 17 wherein, in the event of a failure the system is configured to recover all in-doubt transactions without using a transaction log by:
  comparing the list of in-doubt transactions retrieved from each resource manager other than the determiner resource manager with the list of in-doubt transactions retrieved from the determiner resource manager;
  committing all in-doubt transactions which appear in the list of in-doubt transactions retrieved from each resource manager other than the determiner resource manager and which also appear in the list of in-doubt transactions retrieved from the determiner resource manager; and
  rolling back all in-doubt transactions which appear in the list of in-doubt transactions retrieved from each resource manager other than the determiner resource manager but do not appear in the list of in-doubt transactions retrieved from the determiner resource manager.

21. The system of claim 17 wherein, in the event of a failure the system is configured to commit transactions which appear in the list of in-doubt transactions retrieved from the determiner resource manager after recovering all other resource managers in the plurality of resource managers.

22. The system of claim 17 wherein:
  the determiner resource manager receives a list of participant resource managers; and
  the determiner resource manager is configured to wait, before recovering, until the list of participant resource managers are recovered.

* * * * *

UNITED STATES PATENT AND TRADEMARK OFFICE
CERTIFICATE OF CORRECTION

Page 1 of 1

PATENT NO. : 9,146,944 B2
APPLICATION NO. : 13/828590
DATED : September 29, 2015
INVENTOR(S) : Parkinson It is certified that error appears in the above-identified patent and that said Letters Patent is hereby corrected as shown below:

In the drawings,

Drawing sheet 1 of 6, FIG. 1, line 6, delete "Exhange" and insert -- Exchange --, therefor.

Drawing sheet 6 of 6, FIG. 6, under reference numeral 601, line 1, delete "receiveing" and insert -- receiving --, therefor.

Drawing sheet 6 of 6, FIG. 6, under reference numeral 605, line 1, before "determiner" delete "the the" and insert -- the --, therefor.

In the specification,

Column 8, line 50, before "601," delete "step step" and insert -- step --, therefor.

Column 8, lines 53-54, before "602," delete "step step" and insert -- step --, therefor.

Column 8, line 56, before "603," delete "step step" and insert -- step --, therefor.

In the claims,

Column 10, line 47, claim 7, after "committing" delete "a".

Column 12, line 19, claim 17, delete "memory" and insert -- memory; --, therefor.

Signed and Sealed this
Seventh Day of June, 2016

Michelle K. Lee
*Director of the United States Patent and Trademark Office*